June 17, 1947. W. W. WATROUS, JR 2,422,324
SPARK GAP DEVICE
Filed Feb. 10, 1944 2 Sheets-Sheet 1

INVENTOR
W. W. WATROUS, JR
BY
ATTORNEY

June 17, 1947.　　W. W. WATROUS, JR　　2,422,324
SPARK GAP DEVICE
Filed Feb. 10, 1944　　2 Sheets-Sheet 2
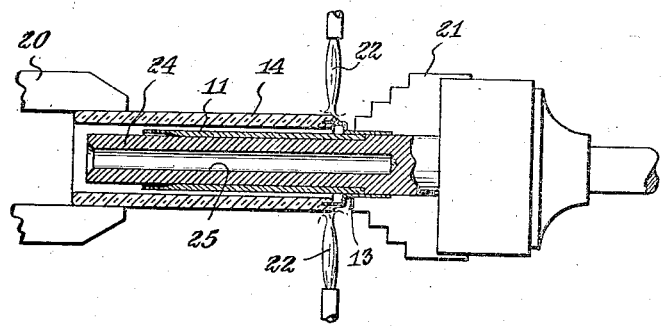
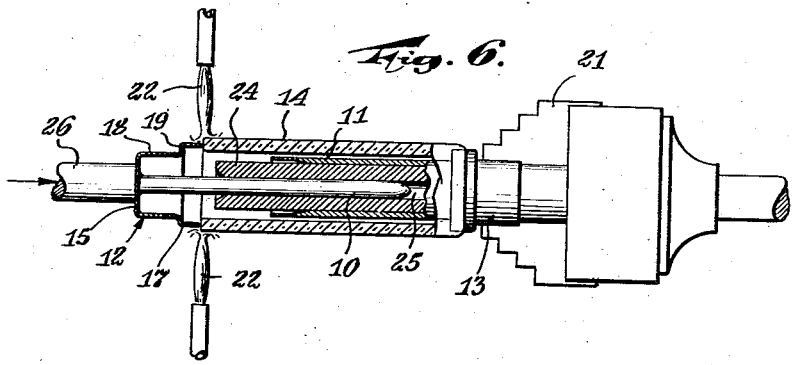
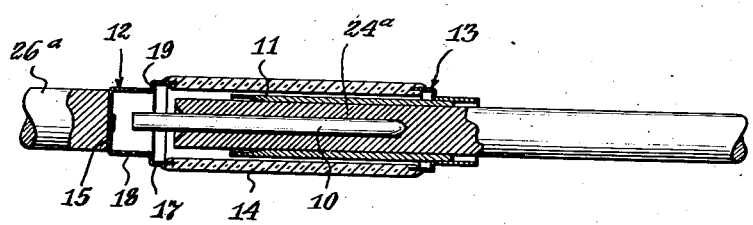
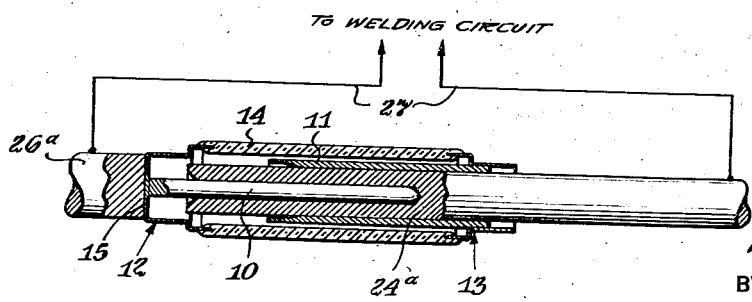
INVENTOR
W.W. WATROUS, JR
BY
ATTORNEY Patented June 17, 1947

2,422,324

UNITED STATES PATENT OFFICE 2,422,324

SPARK GAP DEVICE

Ward W. Watrous, Jr., Chatham, N. J., assignor to Westinghouse Electric Corporation, East Pittsburgh, Pa., a corporation of Pennsylvania Application February 10, 1944, Serial No. 521,807

6 Claims. (Cl. 250—27.5)

This invention relates to spark gap devices, and more particularly to devices of that character for use in connection with pulsing of electrical wave energy.

In a series spark gap modulator used to generate pulses of energy for radar applications, it has been found that extraordinary precision in the alignment of electrodes is necessary. This accurate alignment is required inasmuch as experience indicates that unequal spacing results in the rapid erosion of the cathode, and under some conditions of operation results in a "spike" growth on the anode. The "spike" growth is particularly troublesome as it cannot only cause a gradual change in electrical characteristics, but can produce an actual shorting of the tube elements.

Due to the additive accumulation of tolerances in the course of manufacture of prior art devices of the character above referred to, it is extremely difficult to produce the same, even experimentally, to the accuracies required, and manufacture on a production basis at reasonable cost has been until now practically impossible.

In its broadest aspects, therefore, the invention proposes solution to the heretofore unsolved problems referred to above.

More specifically, the invention contemplates manufacture on a production basis of accurately spaced electrodes in a spark gap device.

An object of the invention is to provide a device as characterized which is structurally adaptable to mass production and yet possessing precision of alignment and spacing of the electrodes.

A further object of the invention is to provide a strong, rigid, compact and efficient device particularly adapted to pass or generate pulses in conjunction with other radar equipment.

Yet another object of the invention is to provide an improved method of fabrication of a device as characterized.

Other objects of the invention will appear to those skilled in the art as the description progresses, both by direct recitation thereof and by implication from the context.

Referring to the accompanying drawing in which like numerals of reference indicate similar parts throughout the several views.

Figure 1:
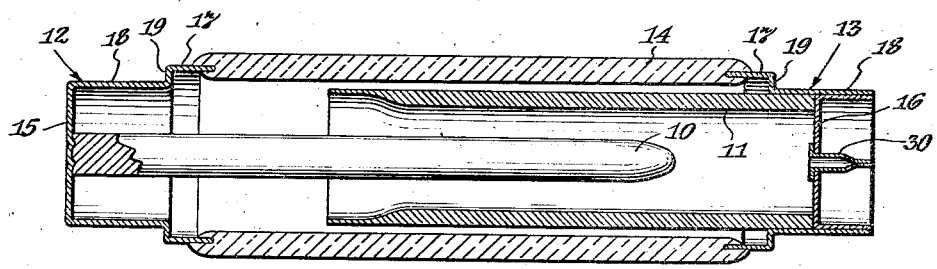
Figure 1 is a longitudinal sectional view of a spark gap device constructed in accordance with the present invention.
Figure 2:
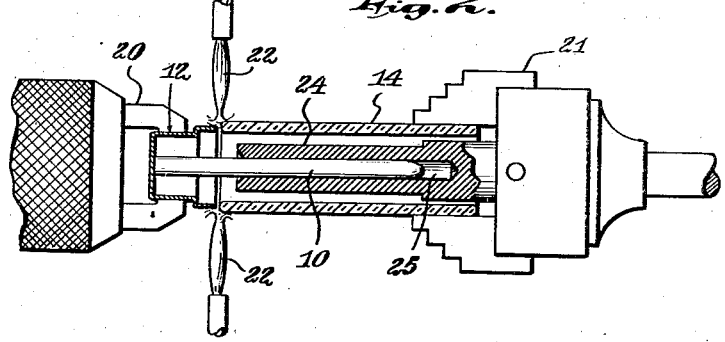
Figures 2, 3 and 4 are views, partially in longinal section, showing successive steps of one process for fabrication of said device.
Figure 3:
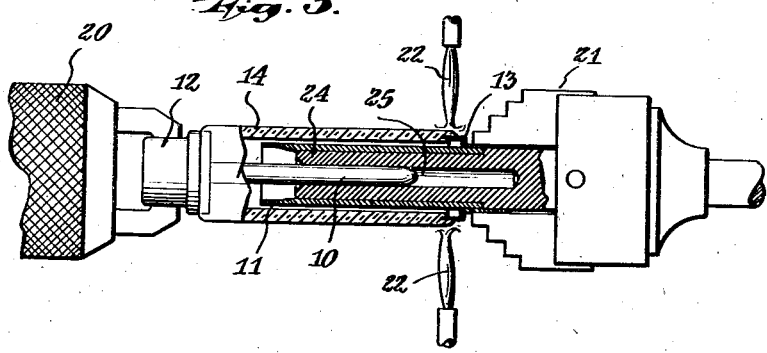
Figure 4:
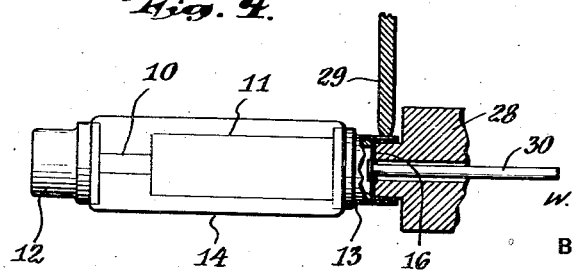

Figures 5 and 6 are similar to Figures 2, 3 and 4 but showing a modification in the process of fabrication; and Figures 7 and 8 are again longitudinal sectional views showing another modification of the process of fabrication.

In the specific embodiment of the invention illustrated in said drawing, the reference numeral 10 designates a rod-like electrode which projects into an open end of a hollow cylindrical electrode 11 coaxial therewith. Precise coaxial assembly of these two electrodes is of utmost importance. It is a further prerequisite of the device that the electrodes are enclosed within an envelope containing a particular gas and preferably that the electrodes have their supports respectively at opposite ends of the envelope. According to the present invention, metallic caps 12, 13 are provided as the terminal portions of the envelope, the inner ends of said caps being sealed to an intervening sleeve 14 of glass or other insulating material, said sleeve and caps having cylindrical configuration and on a common axis coincident with the axis of the electrodes. The cylindrical portions of the caps are alike, thereby presenting a symmetrical configuration to the envelope. The caps as shown differ, however, as to their end walls, one of said caps, as 12, having an end wall 15 integral with the cylindrical side wall thereof, whereas the other said cap 13 has its end wall separately formed as a header 16 applied within the cylindrical side wall of the cap and welded or otherwise sealed thereto as a final step in the fabrication process.

For the most satisfactory results, said caps, and particularly the cylindrical walls thereof are preferably composed of an alloy, more fully described in Patent No. 2,062,335 of December 1, 1936, to Howard Scott, assigned to the same assignee as the present invention, and constituting a material sold in the trade under the name of "Kovar." The glass portion of the envelope is preferably of borosilicate glass also of character described in said patent.

Both caps, by preference, have their inner or glass attaching ends 17 of larger diameter than the outer end portions 18, a transverse shoulder 19 integral with both cylindrical end portions intervening between the said end portions. Each said shoulder is integral with both said portions of the cap of which said portions and shoulder are a part. The rod-like electrode is secured by welding or otherwise to the integral transverse end wall 15 of cap 12 whereas the hollow cylindrical electrode is welded or otherwise secured to the reduced and cylindrical end portion 18 of the opposite cap 13. In practice, the rod-like electrode is made of rigid material, such as iron or steel in the form of drill-rod, although other materials such as nickel, molybdenum and the like may be employed. The hollow electrode 11 may be formed of aluminum tubing or other suitable metal. Throughout the showing in the drawing, the hollow electrode 11 is secured, as by welding, to the open-ended cap 13, and this unification is performed prior to applying the glass sleeve 14 to said cap 13.

Referring now specifically to the method of assembly depicted in Figures 2-4, indication is there given that as a primary step the rod-like electrode is assembled with cap 12 so as to project coaxially from the same and thereby constitute one electrode unit. This unit is secured in a rotatable lathe tail-stock chuck 20 by engagement of the chuck jaws with the reduced cylindrical end portion 18 of the cap, and with the rod-like electrode directed toward the head-stock. Glass sleeve 14 is carried by the jaws of a head-stock chuck 21 rotatable at equal speed with the tail-stock chuck. The tail-stock is moved toward the head stock to bring the edge of end 17 of the cap into butt engagement with the end of the glass sleeve, and while those parts rotate, a flame 22 is played on the juxtaposed ends, softening the glass, permitting the cap to be forced thereinto, continued heat obtaining desired fusion or sealing of the glass to the cap in coaxial alignment.

The other or open-ended cap 13 is pre-assembled with its electrode, namely, the hollow cylindrical electrode, thereby constituting a second unit, and as shown in Fig. 3, this second unit is next applied to the remaining open end of glass sleeve 14. This is accomplished by mounting the second electrode unit in the head-stock chuck of the same lathe in which the first and now glassed unit is carried. Again, while flame 22 is played on juxtaposed ends, the glass sleeve is pressed longitudinally onto the end margin of the cap, with both units and the glass sleeve rotating.

A principal feature of the invention consists in obtaining positive coaxial alignment of the electrodes while sealing the units to the glass sleeve. This feature is accomplished by having the one cap 13 open-ended and admitting a mandrel 24 longitudinally into the interior of the device. The mandrel has an outside cylindrical surface of correct diameter for sliding fit within the hollow cylindrical electrode 11. At the forward end of the mandrel, coaxial therewith, is a central bore or socket 25 of adequate depth and correct diameter for slidably receiving the rod-like electrode therein. Said mandrel is shown as protruding through the head-stock chuck and as receiving a considerable length of the rod-like electrode in said bore or socket 25 and supporting and aligning the said electrode. Only a very light driving engagement of the tail-stock chuck is required or desirable, since it is the mandrel which determines the axial alignment of the rod.

During the subsequent step of applying the second unit with its hollow electrode, the said unit is slid onto the said mandrel when applying said unit in the chuck. Then in moving up the tail-stock chuck the rod electrode enters said socket 25 of the mandrel again to a very considerable depth before the glass sleeve reaches juxtaposition to the cap 13 carried by the head-stock chuck. By virtue of the fit of the mandrel with respect to both electrodes, the said electrodes will be aligned coaxially very precisely when the seal is made between cap 13 and glass sleeve 14.

While the above description relates the order of sealing of the glass sleeve to the open-ended cap as performed after sealing the closed-ended cap to said sleeve, this order may be reversed as indicated in Figures 5 and 6. In Figure 6, it is indicated furthermore, that the tail-stock chuck is entirely released from grip upon the cap, and instead, a plunger 26 is rotated thereby, and engages and presses against the end of the cap 12 for embedding the rim of the cap in the glass. Thus, even though the rod electrode was not welded or attached to the end wall 15 of the cap with coaxial precision, the electrode will be coaxial to the hollow electrode and not under any lateral strain introduced by gripping of the cap by chuck jaws.

Further modification of procedure is indicated by Figures 7 and 8, wherein it is to be understood the end caps are both applied and sealed to the glass sleeve in approved manner such as indicated in Figures 2 and 3 by mounting in rotating chucks, or otherwise. However, according to Figures 7 and 8 the rod electrode is not prewelded to its cap, but is applied after the glassing operations are completed. In carrying out this modified process, the socketed mandrel 24ª is utilized as a welding electrode so that upon completion of the glassing the rod electrode carried in the socket of said mandrel or welding electrode and projecting from the end thereof may be pressed against the end wall 15 of the cap. A plunger 26ª constituting a second welding electrode, is situated at the outside of said wall 15. Said mandrel and second welding electrode are connected in an appropriate welding circuit 27 and when the second welding electrode presses against the outside of end wall 15 and the rod electrode is pressed against the inside of said end wall 15 of the cap, welding thereat is effected. As before, the mandrel obtains precise coaxial alignment of the rod and tubular electrodes of the device, and following the welding operation, is removed.

In all showings herein, after withdrawal of the mandrel, the header 16 is applied in the open end of the open-ended cap 13. Said cap is shown in Figure 4 as applied upon a welding electrode 28 which cooperates with another electrode 29 at the outside of the cap for effecting a peripheral weld between the flange of the header and the cylindrical wall of the cap.

The header may conveniently provide a tubulation 30 by which the device may be evacuated and recharged with appropriate gas, such as hydrogen, at suitable pressure for giving the gap between electrodes 10, 11 the desired breakdown characteristic.

I claim:

1. A spark gap device comprising opposite end caps of which one has an integral outer end wall and of which the other has a header closing the outer end thereof, a hollow cylindrical electrode secured to the same cap having said header, a rod-like electrode secured to the said end wall integral with the other cap, said rod-like electrode being rigid and projecting coaxially into said hollow cylindrical electrode, said cap to which the cylindrical electrode is secured providing a cylindrical flange of greater diameter than said cylindrical electrode coaxial therewith and directed toward the other cap, said other cap having a like cylindrical flange directed toward the first said flange, and an insulating sleeve interposed between and sealed at its opposite ends to the ends of said flanges which are directed toward each other, said sleeve being coaxial to and surrounding both electrodes.

2. A spark gap device comprising opposite end caps and an interposed glass sleeve between said end caps sealed to each, a hollow cylindrical electrode secured to the interior of one of said end caps, said one end cap having an interior diameter beyond the electrode to the outer end of said one end cap as large as the hollow interior of said electrode and having a header closing the said one end cap next the outer end thereof and entirely beyond the end of said electrode, and a cooperating electrode carried by the other said end cap, said cap to which the cylindrical electrode is secured providing a cylindrical flange of greater diameter than said cylindrical electrode coaxial therewith and directed toward the other cap, said other cap having a like cylindrical flange of equal diameter to and directed toward the first said flange, and an insulating sleeve interposed between and sealed at its opposite ends to the ends of said flanges which are directed toward each other, said sleeve being coaxial to and surrounding both electrodes.

3. A method of fabrication of a spark gap device having a hollow electrode, a coaxial electrode therein and end caps therefor of which one has an open end as large as the hollow electrode to fit thereover, comprising applying and securing the open ended cap on the end margin of the hollow electrode, inserting a hollow mandrel through the open end of said cap into the hollow electrode, securing the other electrode to the other end cap, and inserting said other electrode into the hollow of the mandrel within the hollow electrode, and rigidly joining said end caps to an intervening sleeve.

4. A method of fabrication of a spark gap device having a hollow electrode, a coaxial electrode therein and end caps therefor of which one has an open end as large as the hollow electrode to fit thereover, comprising applying and securing the open ended cap on the outside of the hollow electrode next the end margin thereof providing an opening through the cap as large as the hollow of said hollow electrode and on a common axis therewith, inserting a hollow mandrel through said opening and into said hollow electrode coaxial to both, securing the other electrode to the other end cap, inserting said other electrode into the hollow of the mandrel within the hollow electrode coaxial thereto, rigidly joining said end caps to an intervening sleeve around the hollow electrode while maintaining the electrodes coaxial, and withdrawing said mandrel longitudinally from the hollow electrode through said opening of the open ended cap.

5. A method of fabrication of a spark gap device having a hollow electrode, a coaxial electrode therein and end caps therefor of which one has an open end as large as the hollow electrode to fit thereover, comprising applying and securing the open ended cap on the outside of the hollow electrode next the end margin thereof providing an opening through the cap as large as the hollow of said hollow electrode and on a common axis therewith, inserting a hollow mandrel through said opening and into said hollow electrode coaxial to both, securing the other electrode to the other end cap, inserting said other electrode into the hollow of the mandrel within the hollow electrode coaxial thereto, rigidly joining said end caps to an intervening sleeve around the hollow electrode while maintaining the electrodes coaxial, withdrawing said mandrel longitudinally from the hollow electrode through said opening of the open ended cap, and inserting a header in the said opening of the open ended cap and sealing the same to said cap.

6. A method of fabrication of a spark gap device having a hollow electrode overlapping and coaxial to a central electrode, each said electrode having a basal end projecting away from the overlapped portions of the said electrodes, comprising separately fixing the basal end of each electrode to an end cap, with one cap left open at its outer end, telescoping the electrodes to overlapped position, sealing an intervening sleeve to said caps while holding the electrodes through said open end coaxially telescoped, and applying a header to one end cap for closing the same after the sleeve is sealed to the caps.

WARD W. WATROUS, Jr.

REFERENCES CITED

The following references are of record in the file of this patent:

UNITED STATES PATENTS

| Number | Name | Date |
|---|---|---|
| 1,616,812 | Lilienfeld | Feb. 8, 1927 |
| 2,324,557 | Claesson | July 20, 1943 |
| 2,217,448 | Muller | Oct. 8, 1940 |
| 1,656,957 | Schroter | Jan. 24, 1928 |
| 2,288,861 | Watrous | July 7, 1942 |
| 2,024,585 | Laico | Dec. 17, 1935 |
| 2,397,982 | Salzberg | Apr. 9, 1946 |
| 2,079,354 | Knowles | May 4, 1937 |